United States Patent [19]
Aoki

[11] Patent Number: 5,325,304
[45] Date of Patent: Jun. 28, 1994

[54] PRODUCTION INSTRUCTING APPARATUS FOR FEEDING REQUIRED QUANTITIES OF MATERIALS TO MEET AN APPOINTED DELIVERY DATE

[75] Inventor: Toshiaki Aoki, Itami, Japan

[73] Assignee: Mitsubishi Denki Kabushiki Kaisha, Tokyo, Japan

[21] Appl. No.: 695,046

[22] Filed: May 2, 1991

[30] Foreign Application Priority Data

May 18, 1990 [JP] Japan ................................ 2-130001

[51] Int. Cl.$^5$ ............................................. G06F 15/46
[52] U.S. Cl. ...................................... 364/468; 364/401
[58] Field of Search ................. 364/403, 401, 468, 478

[56] References Cited

U.S. PATENT DOCUMENTS

| | | | |
|---|---|---|---|
| 5,093,794 | 3/1992 | Howie et al. | 364/468 |
| 5,099,431 | 3/1992 | Natarajan | 364/468 |
| 5,101,352 | 3/1992 | Rembert | 364/468 |
| 5,148,370 | 9/1992 | Litt et al. | 364/468 |
| 5,170,355 | 12/1992 | Hadavi et al. | 364/468 |
| 5,195,041 | 3/1993 | George et al. | 364/468 |
| 5,204,821 | 4/1993 | Inui et al. | 364/468 |

FOREIGN PATENT DOCUMENTS 4116277.3-53  6/1992  Fed. Rep. of Germany .
WO91/03793   3/1991  PCT Int'l Appl. .

OTHER PUBLICATIONS

"Rechnerintgrierte Productionsutomatisierung," *Der Elektroniker* No. 9, 1987, pp. 29–33 (w/translation).
"Notizer Und Berichte Aus Der Datenverarbeitung," *Computer-Praxis* 1972, 9th Ed., pp. 257–262 (w/translation).

Primary Examiner—Jerry Smith
Assistant Examiner—Jim Trammell
Attorney, Agent, or Firm—Townsend and Townsend Khourie and Crew

[57] ABSTRACT

A production instructing apparatus which is provided with a file for storing the state of every product being manufactured and every stock product and a file for storing the producing capacity of each producing apparatus calculates the feeding quantity for each process for the insufficient quantity of the products through comparison of the shipping quantity of the products with the state of the products being manufactured and stock products, calculates the feeding date of required articles for the insufficient quantity of the products to the producing apparatus on the basis of the calculated feeding quantity and producing capacity, determines the scheduled date for delivery from the calculating result, judges whether or not the products are in time for the appointed delivery date by comparing the scheduled date for delivery with the appointed delivery date, and instructs feeding of materials, half finished products and the like for the products which would miss the appointed delivery date to the producing apparatus so that the products are produced preferentially. Accordingly, it can be prevented that the appointed delivery date be missed and the useless stock be generated while the feeding instruction is made precisely.

3 Claims, 9 Drawing Sheets

Fig. 2

| ITEM | EXAMPLE |
|---|---|
| ORDER No. | 9871234 |
| MODEL No. | M1-001P |
| QUANTITY | 20,000 |
| APPOINTED DATE OF DELIVERY | 11/30/90 |
| CUSTOMER CODE | H01 |
| ORDER DATE | 11/01/90 |

Fig. 3

| ITEM | EXAMPLE |
|---|---|
| ORDER No. | 9871234 |
| MODEL No. | M1-001P |
| QUANTITY | 20,000 |
| SCHEDULED FEEDING DATE | LOT 1, LOT 2 ---- LOT N<br>1st PROCESS  11/02/90, 12:00<br>2nd PROCESS  •<br>3rd PROCESS  •<br>⋮<br>(n-1)th PROCESS  11/29/90, 6:00<br>nth PROCESS  11/29/90, 12:00 |
| No. OF ALLOCATED | STOCK    5000<br>HALF-FINISHED  (n-1)th PROCESS  5,000<br>HALF-FINISHED  3rd PROCESS  5,000<br>(1 LOT WAFERS) |
| No. OF REQUIRED TO FEED | HALF-FINISHED  1st PROCESS  5,000<br>(1 LOT 25 WAFERS) |

Fig. 4

| ITEM | | | EXAMPLE |
|---|---|---|---|
| MODEL No. | | | M1-001P |
| No. OF STOCKS | | | 5000 |
| No. OF HALF-FINISHED | TEST PROCESS | nth PROCESS | 0 |
| | | (n-1)th PROCESS | 5,051 |
| | ASSEMBLY PROCESS | ⋮ | ⋮ |
| | WAFER PROCESS | 3rd PROCESS | 1 LOT. 25 WAFERS |
| | | 2nd PROCESS | 0 |
| | | 1st PROCESS | 0 |

Fig. 5

| ITEM | EXAMPLE | | |
|---|---|---|---|
| MODEL No. | M1-001P | | |
| No. OF STOCKS | 5000 | | |
| No. OF HALF-FINISHED FINAL No. OF NON-DEFECTIVE ICs | PROCESS | No. OF HALF-FINISHED | FINAL No. OF NON-DEFECTIVE ICs |
| | nth PROCESS | 0 | 0 |
| | (n-1)th PROCESS | 5051 | 5000 |
| | ⋮ | ⋮ | ⋮ |
| | 3rd PROCESS | 25 WAFERS | 5000 |
| | 2nd PROCESS | 0 | 0 |
| | 1st PROCESS | 0 | 0 |

Fig. 6

| PRODUCING LINE | A B C LINE | |
|---|---|---|
| APPARATUS & No. OF APPARATUS | DA01<br>DA02<br>⋮<br>TA01<br>TA02<br>TB01<br>TB02 | 2<br>1<br><br>2<br>1<br>2<br>1 |
| UPPER LIMIT OF URGENT LOTS | 20% | |

Fig. 7

| ABC LINE | | DATE TIME | 11/1 12 | 24 | 11/1 12 | 24 | |
|---|---|---|---|---|---|---|---|
| APPARATUS | No. | | | | | | |
| DA01 | 1 | | ORDER-2 | ORDER-4 | ORDER-6 | | |
| DA01 | 2 | | ORDER-3 | ORDER-5 | ORDER-7 | | |
| DA02 | 1 | | ORDER-1 | ORDER-2 / ORDER-3 / ORDER-4 | ORDER-5 / ORDER-7 / ORDER-6 | | |
| ---- | | | | | | | |

Fig. 8

| ITEM | EXAMPLE | | | | |
|---|---|---|---|---|---|
| MODEL No. | M1-001P | | | | |
| NUMBER OF THEORETICALLY CHIP PER WAFER | 250 | | | | |
| NUMBER OF WAFER PER LOT | 25 | | | | |
| LINE | A B C | | | | |
| PROCESS FLOW<br>APPARATUS<br>STANDARD PRODUCTION PERIOD<br>YIELD | | PROCESS | APPARATUS<br>1 . 2<br>STANDARD PRODUCTION PERIOD<br>1 . 2 | YIELD | |
| | | | | PER PROCESS | ACCUMLATIVE YIELD |
| | WAFER PROCESS | 1st PROCESS | DA01<br>4Hr/Lot<br>(2Hr/Lot) | 1.0 | 0.80 |
| | | 2nd PROCESS | DA02<br>2Hr/Lot<br>(1Hr/Lot) | 1.0 | 0.80 |
| | | 3rd PROCESS | DA03<br>12Hr/Lot<br>(6Hr/Lot) | 0.99 | 0.80 |
| | ⋮ | ⋮ | ⋮ | | |
| | ASSEMBLY & TEST PROCESS | (n-1) PROCESS | TA01  TA02<br>5Hr/1000 5Hr/1000<br>(2.5Hr/Lot)(2.5Hr/Lot) | 0.99 | 0.99 |
| | | n PROCESS | TB01  TB02<br>4Hr/1000 4Hr/1000<br>(2Hr/Lot)(2Hr/Lot) | 1.0 | 1.0 |

PRODUCTION INSTRUCTING APPARATUS FOR FEEDING REQUIRED QUANTITIES OF MATERIALS TO MEET AN APPOINTED DELIVERY DATE

BACKGROUND OF THE INVENTION

1. Field of the Invention

The present invention relates to a production instructing apparatus which instructs feeding of materials, half finished products and the like required for production, and more particularly to a production instructing apparatus designed to produce products in proper quantities in compliance with a received order under the producing capacity thereof.

2. Description of Related Art

A producer makes a producing plan on the basis of contents of an order. Actually, it is detected before production of products whether or not the stock or half finished products can supplement the received order, and then a feeding plan is built only for the products falling short of supply, so that the material, half finished products and the like are fed to the producing apparatus according to the feeding plan.

By the way, according to the above-mentioned procedure, it disadvantageously takes quite a long time after the receipt of an order by a producer before the products are actually supplied. In addition, since there is a fear that the feeding quantity for products is miscalculated, this leads to an enormous instruction of the feeding quantity. When the feeding quantity is smaller than expected, it causes a delay of delivery, and when larger, it results in the unrequired stock.

Moreover, when the feeding plan is made, as the producing capacity of the producing apparatus which varies according to the producing state is not taken into consideration, sometimes products may not be completed on the expected date in spite of the actual feeding of materials, etc. if the producing capacity at that time is insufficient.

Even when the feeding plan is made according to a certain order of products, there may be a case where the delivery date of products of another order is earlier than this. Therefore, it is difficult to judge when the feeding dates of the respective products should be set. It is hard alike to instruct definitely the feeding priority of the products in each order.

SUMMARY OF THE INVENTION

The present invention has been devised in view of such circumstances, and the object thereof is to provide a production instructing apparatus which is capable of immediately instructing feeding of materials, half fabricated items and the like for a required quantity of products with the definite priority without missing an appointed shipping date.

In order to attain the above object, the production instructing apparatus of the invention is provided with a first and second memory parts for respectively storing information related to the half finished and stock products, and producing capacity of a producing apparatus, and a feeding instructing part for detecting whether or not the products can be allotted through comparison of the information of the first memory part with the shipping quantity thereby to instruct feeing of materials, half fabricated items and the like for the products unable to be alloted on the basis of the producing capacity stored in the second memory part and the appointed shipping date of products.

In the production instructing apparatus of the present invention, first, the data stored in the first memory part, that is, the data related to the half finished and stock products, is compared with the quantity of products to be shipped, whereby whether or not the required quantity of products can be fulfilled is detected. In consequence, the feeding instructing part instructs feeding of materials, half fabricated items and the like for the insufficient quantity of products to the producing apparatus on the basis of the producing capacity stored in the second memory part and the appointed shipping date of products.

BRIEF DESCRIPTION OF THE DRAWINGS

FIG. 2 is a table showing a concrete example of input data of an order input part;

FIG. 3 is a table of a concrete example of stored data of an order data file;

FIG. 4 is a table of a concrete example of input data of an input part of half finished and stock products;

FIG. 5 is a table of a concrete example of stored data of half finished and stock data file;

FIG. 6 is a table of a concrete example of input data of a producing capacity input part;

FIG. 7 is a table of a concrete example of stored data of a producing capacity file;

FIG. 8 is a table of a concrete example of input data of a reference data input part.

DESCRIPTION OF THE PREFERRED EMBODIMENTS

Figure 1:
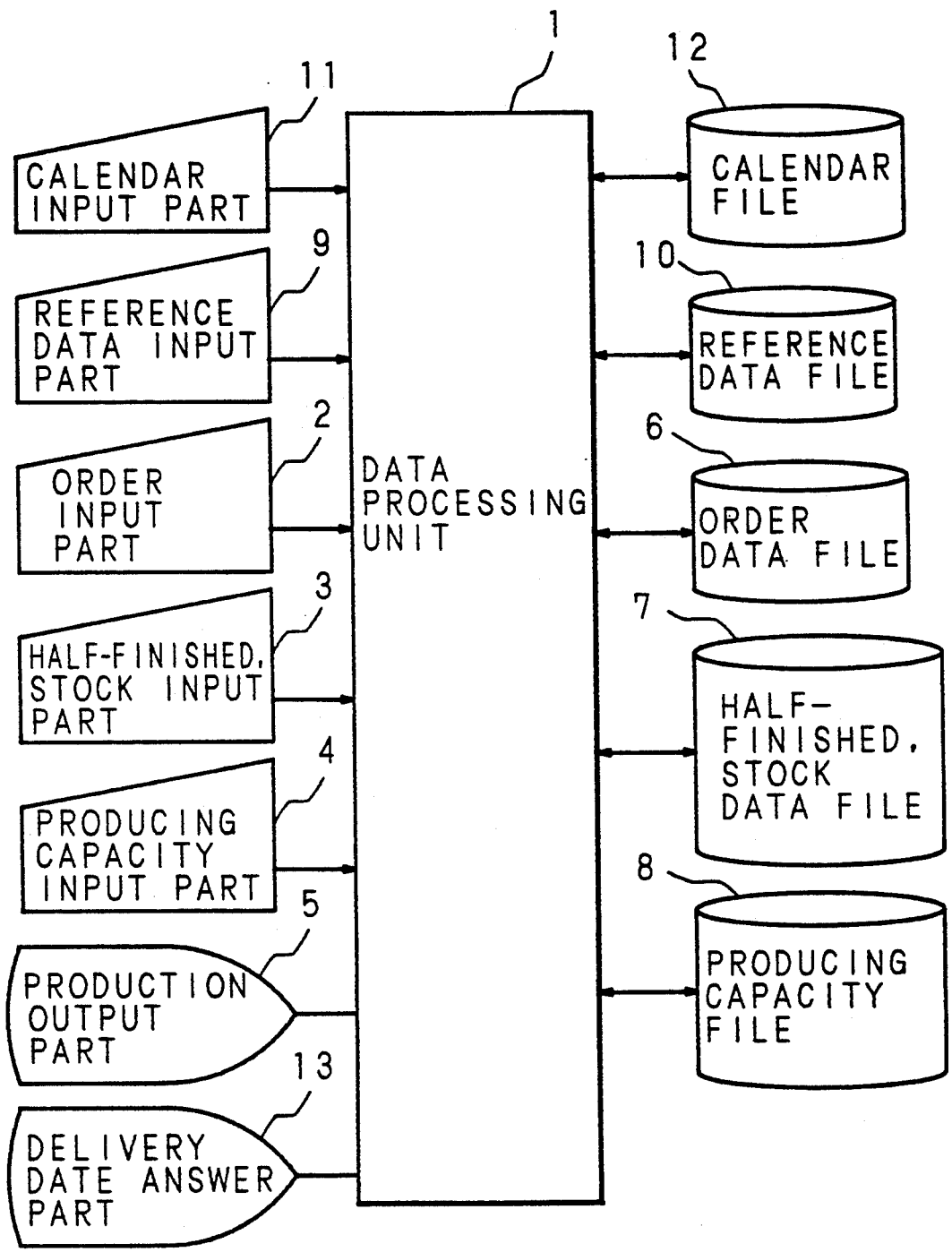
FIG. 1 is a block diagram showing the construction of a production instructing apparatus according to the invention.

In the following, explanation of the present invention will be made referring to drawings showing an embodiment thereof. In FIG. 1, reference numeral 1 is a data processing unit employing a CPU. To the data processing unit 1, data of an order input part 2 a half finished and stock input part 3 a producing capacity input part 4 a reference data input part 9 a calendar input part 11 are inputted. The contents of these input data are respectively stored in an order data file 6, a half finished and stock data file 7 as a first memory means, producing capacity file 8 as a second memory means, a reference data file 10 and a calendar file 12. The data processing unit 1 performs processings of the stored data which will be described later and, a production output part 5 outputs the feeding instruction (feeding priority) for respective processes, and the delivery date answer part 13 outputs the delivery date. The production output part 5 automatically instructs the feeding priority to the respective apparatuses when the producing apparatus is automatically operated. That is, the production output part 5 arranges the received orders in order from the earliest priority date. In addition, when the producing apparatus is not automatically operated, the feeding priority is printed in a list by a printer or displayed at the CRT, thereby informing an operator of the matter.

FIG. 2 is a table showing an example of the content of an order inputted from the order input part 2. The content of the order inputted from the order input part 2 including an order number, a model number, the ordered quantity, an appointed date of delivery, a customer's code, and the date of order is sent from an order entry system (not shown). The order number is assigned to each order, which becomes a key word for shipping, payment, inquiry and the like. The model number is used for distinguishing products in a catalog or the like, so that a customer makes an order by the model numbers. For example, the data consisting of "9871234" as an order number, "M1-001P" as a model number, "20,000" as the ordered quantity, "Nov. 30, 1990" as a delivery date "H01" as a customer's code and "Nov. 1, 1990" as the date of order are inputted.

FIG. 3 is a table showing an example of stored data of the order data file 6. In the order file 6, the aforementioned contents of the received order inputted through the order input part 2 are stored as well as a scheduled feeding data in every process planned on the basis of the contents of the received order, the number of products which are to be allocated by the stock and half finished products and data related to the scheduling result of the required feeding number of products.

FIG. 4 is a table showing an example of an input data of the half-finished and stock input part 3. The state of the half finished and stock products is sent from another system such as a process control system or the like, which state includes data, e.g., the number of stock products of every model number and the number of products being manufactured at each process. The stock number is the number of products which have been completely finished and therefore stored in a warehouse or the like as finished products. Accordingly, when an order comes, the products can be immediately shipped. The number of products being manufactured is inputted for every process of a model number as mentioned above, and in the case of the producing process of semi-conductors, the number is inputted for every minute process, that is, wafer process, assembly process and test process. Moreover, in the producing process of semi-conductors, since the number of nondefective integrated circuits (hereinafter referred to as an IC) is made clear when the wafer process is finished, the number of ICs (nondefective ICs) and that of wafers are inputted as the number of products being manufactured in the assembly and test processes and in the wafer process, respectively. By way of example, for the products with the model number "M1-001", when there are 5,000 stock products, one lot (25 wafers) of half finished products at the third process (wafer process) among n processes from the wafer process to the test process, and 5,051 half finished products at an n-1th process (test process), the data is sent from the process control system, and inputted as the data of the half finished and stock products.

FIG. 5 is a table showing an example of stored data of the half finished and stock data file 7. The half finished and stock data file 7 stores the half finished and stock data inputted from the half finished and stock input part 3, and uses the same when calculating the feeding number of required products after allocating the half finished and stock products to the ordered number. At this time, it is necessary to calculate the final number of the non-defectives from the number of the half finished products with reference to the yield in each process stored in the reference data file. The final number of the non-defectives is obtained, in the assembling and testing processes, by multiplying the accumulated yield obtained by multiplying the yield from the process where the products are being finished to the last process with the number of half finished products. In addition, since the number of the half finished products is the number of wafers in the wafer process, the number of ICs is obtained by multiplying the number of the half finished products with the theoretical number of chips indicating how many chips are obtained per every wafer. The final number of the non-defectives can times be obtained by multiplying the calculated number of ICs with accumulated yield. For example, if the accumulated yield is 0.99 and the number of the half finished products is 5,051 at the n-1th process, and the accumulated yield is 0.8, the theoretical number of chips is 250 and the number of the half finished products is 25 at the third process, the respective final numbers of the non-defectives $LN_{n-1}$, $LN_3$ at the n-1th process and the third process are as follows;

$$LN_{n-1} = 5,051 \times 0.99 = 5,000$$

$$LN_3 = 25 \times 250 \times 0.8 = 5,000$$

These numbers are stored.

FIG. 6 is a table showing an example of input data of the producing capacity input part 4. The producing capacity input part 4 is provided to input the producing capacity in each process for scheduling the feeding plan. Here, the data related to the number of producing apparatuses in each production line is inputted as the producing capacity.

FIG. 7 is a table showing an example of stored data of the producing capacity file 8. The producing capacity file 8 is the file used for scheduling of the feeding plan (accumulation of loads), which calculates a scheduled feeding data at respective processes and a possible date for delivery, by allocating the necessary number of products to be fed in each process to the file 8 per every order. The calculated result is stored in the order data file 6.

The respective contents of the half finished and stock data file 7 and the producing capacity file 8 are updated every time there are inputs to the half finished and stock input part 3 and the producing capacity input part 4 respectively. Each of these input parts is so constructed that, every time the state of the half finished products stock products and the producing capacity are changed, the contents thereof are inputted automatically or by an operator.

FIG. 8 is a table showing an example of input data of the reference data input part 9. The data of the theoretical number of chips, the number of wafers per a lot, a production line number, a process flow, apparatuses used in respective processes, the standard production period, the urgent production period, yields of respective processes, and accumulated yield from each process to the last process is inputted for every model number.

The standard production period is set by HOUR/LOT or HOUR/WAFER in the wafer process, and HOUR/LOT or HOUR/1000IC in the assembling and testing process. The period includes the processing time, average waiting time, exchanging time of stages and the like. The urgent production period is obtained by multiplying the standard production period with a predetermined coefficient. It is to be noted here that the processing time, etc. is set based on the previously-achieved values. Moreover, the yield is set by the previously-achieved values in each process. As mentioned before, the theoretical number of chips shows how many chips can be obtained from a wafer when the yield is 100%. These data are inputted before preparing the feeding plan, and stored in the reference data file 10.

Figure 9:
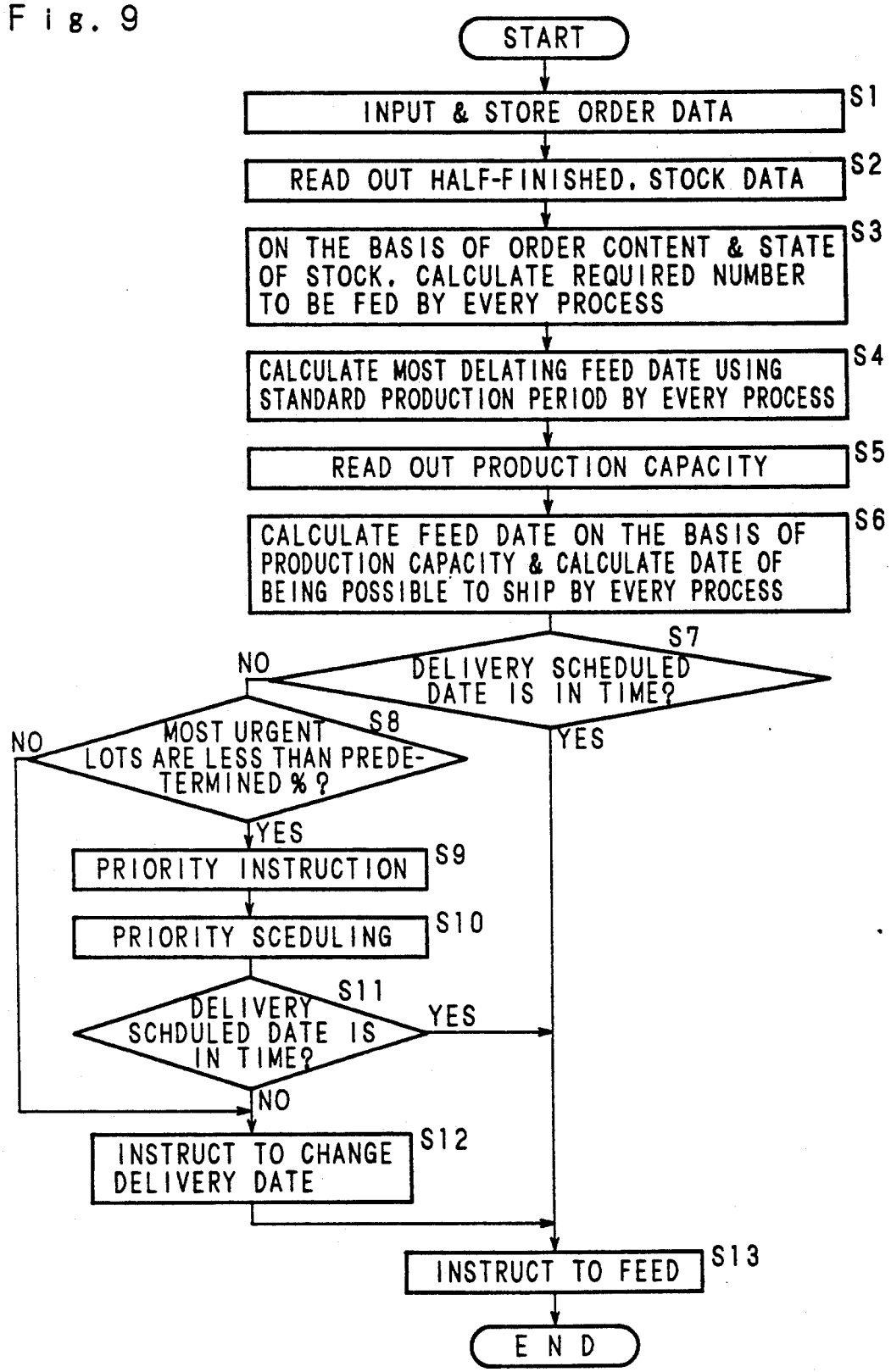
FIG. 9 is a flow chart showing an instructing procedure for feeding according to the apparatus of the invention.

Next, explanation will be given to the procedure for instructing feeding of products by the apparatus of the invention constructed as above with reference to a flow chart shown in FIG. 9.

In the first place, the data processing unit 1 inputs contents of the order from the order input part 2 as shown in FIG. 2 and stores the inputted contents into the order data file 6 (step 1).

Next, the state of the half finished and stock products is read out from the half finished and stock data file 7 (step 2). It is judged whether or not the products can be supplemented through comparison of the read-out state with the quantity of products required by the order, and the necessary number of products to be fed to the producing apparatuses of respective processes, is calculated (step 3). That is, when the required of a model number are found among those under production or stock products, since they can supplement the order, the quantity, of material only for the products unable to be allocated, that is, the number of products necessary to be produced from the beginning is calculated for each process. For example, when the data shown in FIG. 5 is stored in the half finished and stock data file 7, and the stock products is 5,000, the final number of the non-defectives under manufacture is 10,000, and the number of ordered products is 20,000, it is calculated that 25 wafers should be fed for 5,000 products (the final number of the non-defectives) in the first process.

Next, the latest feeding day is calculated for each process to the calculated feeding number of products by using the standard production period based on the previous orders stored in the reference data file 10 (step 4). The latest feeding day is the day without missing the appointed delivery date. For example, if the delivery date is scheduled Nov. 30, 1990 and the standard production period for one lot (25 wafers) from the first process to the n-th process is 20 days in total, the latest feeding day is Nov. 9, 1990.

In the succeeding step 5, the producing capacity of the producing apparatus at the present time and the schedule from now on are read out from the producing capacity file 8. At this time, the loads are already allocated (accumulated) to the lots already fed and the lot reserved before the order. Therefore, the load of the inputted order is allocated to a vacancy where the load is not yet allocated, that is, where the schedule is not determined in the next step 6. In the aforementioned example, as the latest feeding date in the first process is Nov. 9, 1990, a vacancy prior to Nov. 9, 1990 where the load for a lot (4 hr) is unoccupied in the producing apparatuses in the first process (DAO1, two apparatuses) is found out. If a vacancy is present, the load of the order is allocated there. Supposing, for example, that Nov. 5, 1990 is allocated, next, a vacancy where the load is unoccupied in the producing apparatus in the second process (DAO2, one apparatus) is searched between the date of Nov. 5, 1990 and the latest feeding date of the second process. If there is not a load unoccupied in the period, the nearest vacancy in the period on and after the latest feeding date is allocated. In this case, the appointed date of delivery from the customer cannot be kept. By repeating the above procedure, scheduling, that is, allocating the load producing apparatuses is performed to the nth process. The scheduled date when the last nth process is completed will be the possible shipping date, and the scheduled date for delivery is one day after the shipping date, as one day is estimated for transportation. In short, the feeding date in each process is calculated by correcting the latest feeding date previously calculated on the basis of the producing capacity, and the possible shipping date and the scheduled date for delivery are determined on the basis of this feeding date.

Subsequently, it is judged whether or not the scheduled date for delivery meets the appointed delivery date of the order, that is, the scheduled delivery date is earlier than the appointed date from the customer (step 7).

In the case where the appointed delivery date from the customer is later than the scheduled date for delivery, it is judged that whether or not the urgent lots having priority in production is more than a predetermined percentage to the whole lots being manufactured (step 8). If the whole lots being manufactured are urgent ones, it is impossible to send the lots at special speeds. When the urgent lots are said percentage or less, it is judged that the lots can be sent at special speed and the priority instruction is given to the products which would miss the scheduled date for delivery (step 9). The standard production period includes the average waiting time, so that an ordinary lot to be produced in the standard production period is arranged to wait at an entrance of each apparatus. However, the urgent lot overruns the ordinary lot waiting at the entrance, and is immediately fed into the apparatus as soon as the apparatus gets ready. Accordingly, the waiting time is shortened, making it possible for the lot to be processed in 50% the standard production period. Next, a feeding plan corresponding to the producing capacity in each process is built again in the same way as in step 6, using the urgent production period. It is judged again whether or not the scheduled date for delivery is earlier than the appointed date by the customer. When the scheduled date is earlier than or the same as the appointed date, the flow proceeds to step 13, whereas, when the former is later than the latter, the flow proceeds to step 12 to notify the operator of the number of the order, model number, quantity, appointed date of delivery, scheduled date of delivery, the number of missing days, customer code, date of order and the like by displaying on the delivery date answer part 13, so that the operator makes an instruction for changing the delivery date.

In the manner as described above, the products having the earlier delivery date assigned than the other products are fed preferentially.

In the case when the scheduled date of delivery satisfies the appointed date from the customer in step 7 or in step 11, or in the case where the delivery date is instructed to be changed in step 13, the feeding instruction is given for each process on the basis of the feeding date to the scheduled date for delivery (step 13). The feeding instruction is set through the production output part 5. The feeding instruction is given to each producing apparatus automatically in an automatic producing equipment, or to an operator by means of a list, CRT or the like if the equipment is not automatically driven.

As mentioned above, in the production instructing apparatus of the present invention, the time necessary before the materials, half finished products, etc. are fed according to the feeding instruction is greatly shortened since no feeding plan is required to be made by a producer after the contents of an order are inputted. Moreover, since the feeding quantity is correctly calculated without excess and deficiency, it can be prevented that the delivery date is missed due to the omission of feeding of materials and half finished products, without useless stock products being produced. In addition, the feeding priority can be set precisely for vanity products of different scheduled delivery dates easily, whereby the producing cost can be reduced as a whole.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A production instructing apparatus which allocates products being manufactured in the producing apparatuses of respective producing processes and stock products to an order of the products in an appointed quantity and of an appointed delivery date of a customer, and instructs feeding of required products, not being manufactured or in stock, to said production apparatus so that the appointed quantity of products can be delivered at the appointed delivery date to fill said order of products, said production apparatus comprising, a first memory means for storing data specifying the quantity of ordered products being manufactured and in stock, a second memory means for storing the producing capacity of the ordered products of said respective producing apparatuses and a first schedule showing vacancies in a production schedule of said respective producing apparatuses;

a first calculating means for calculating the necessary feeding quantity of required ordered products by subtracting the amount of ordered products being manufactured and in stock stored in said first memory means from the appointed quantity of ordered products, for calculating the latest feeding start date for beginning producing the required quantity of ordered products for delivery prior to the appointed delivery date based on producing capacity stored in said second memory means, for calculating a calculated schedule of production of said necessary feeding quantity in vacancies in the production schedule of said respective producing apparatuses based on the schedule stored in said second memory, with said calculated schedule including a scheduled shipping date indicating when said necessary feeding quantity will be ready to ship; and an instructing means for instructing feeding of said required articles to said producing apparatuses according to the calculated schedule of production of said necessary feeding quantity of ordered products if said scheduled shipping date is prior to said appointed delivery date.

2. A production instructing apparatus as set forth in claim 1, wherein said instructing means comprises a reading means for reading out the producing capacity stored in said second memory means, a second calculating means for calculating a process feeding date for respective producing processes on the basis of the producing capacity read out by said reading means and the latest feeding date calculated by said first calculating means, and for calculating a scheduled date for delivery by adding a transporting time to the scheduled shipping date, a first comparing means for comparing the calculated scheduled date for delivery with the appointed delivery date, and a preferential process means for instructing feeding of said necessary feeding quantity of required articles in order to preferentially produce said necessary feeding quantity of the products if said scheduled date for delivery is not prior to said appointed date for delivery.

3. A production instructing apparatus as set forth in claim 2, wherein said preferential processing means comprises a third calculating means for calculating a priority scheduling delivery date for delivery on the basis of a special production period shorter than said standard production period, a second comparing means for comparing the calculated priority scheduling delivery date for delivery with the appointed delivery date, and an instructing means for instructing a change from the appointed delivery date to a revised delivery date if said second comparing means indicates that the priority scheduling delivery date is later that the appointed delivery date.

* * * * *